United States Patent [19]
Greaves et al.

[11] Patent Number: 5,441,136
[45] Date of Patent: Aug. 15, 1995

[54] FOUR WHEEL DRIVE VEHICLES

[75] Inventors: Victor L. Greaves, Coventry; Christian J. Brace, Westbury, both of United Kingdom; Wilhelm Weigt, Kassel, Germany

[73] Assignee: Massey Ferguson Manufacturing Limited, United Kingdom

[21] Appl. No.: 166,681

[22] Filed: Dec. 14, 1993

[30] Foreign Application Priority Data

Dec. 19, 1992 [GB] United Kingdom ................. 9226513

[51] Int. Cl.⁶ ............................................ F16D 67/02
[52] U.S. Cl. .................................. 192/13 R; 180/244
[58] Field of Search ...................... 192/13 R; 180/244; 74/481

[56] References Cited

U.S. PATENT DOCUMENTS

| 4,456,108 | 6/1984 | Kageyama . | |
| 4,466,519 | 8/1984 | Röer . | |
| 4,878,559 | 11/1989 | Moon et al. | 180/244 |
| 4,951,775 | 8/1990 | Kittle et al. . | |
| 5,248,020 | 9/1993 | Kreitzberg | 180/244 |

FOREIGN PATENT DOCUMENTS

| 3127605 | 1/1983 | Germany . | |
| 3544288 | 7/1986 | Germany . | |
| 3921323 | 6/1990 | Germany . | |
| 4-113937 | 4/1992 | Japan | 180/244 |
| 0770865 | 10/1980 | U.S.S.R. | 192/13 R |
| 1197890 | 12/1985 | U.S.S.R. | 180/244 |

*Primary Examiner*—Rodney H. Bonck
*Attorney, Agent, or Firm*—MacMillan, Sobanski & Todd

[57] ABSTRACT

A braking facility is described for a four wheel drive vehicle having front and rear axles with front and rear pairs of wheels, an engine driving the rear wheels and also connectable to the front wheels via a four wheel drive clutch, and left and right hand brakes on the rear axle operated by a main brake actuating system. The braking facility includes a hand brake lever which operates the left and right rear brakes via a system independent from the main brake actuating system. It also includes a sensor associated with the hand brake lever and arranged to engage automatically the four wheel drive clutch when the hand brake is operated to provide a hand brake lever operated braking facility connected to all four wheels which is independent of the main brake operating system and which is operable when the vehicle is in motion.

20 Claims, 1 Drawing Sheet

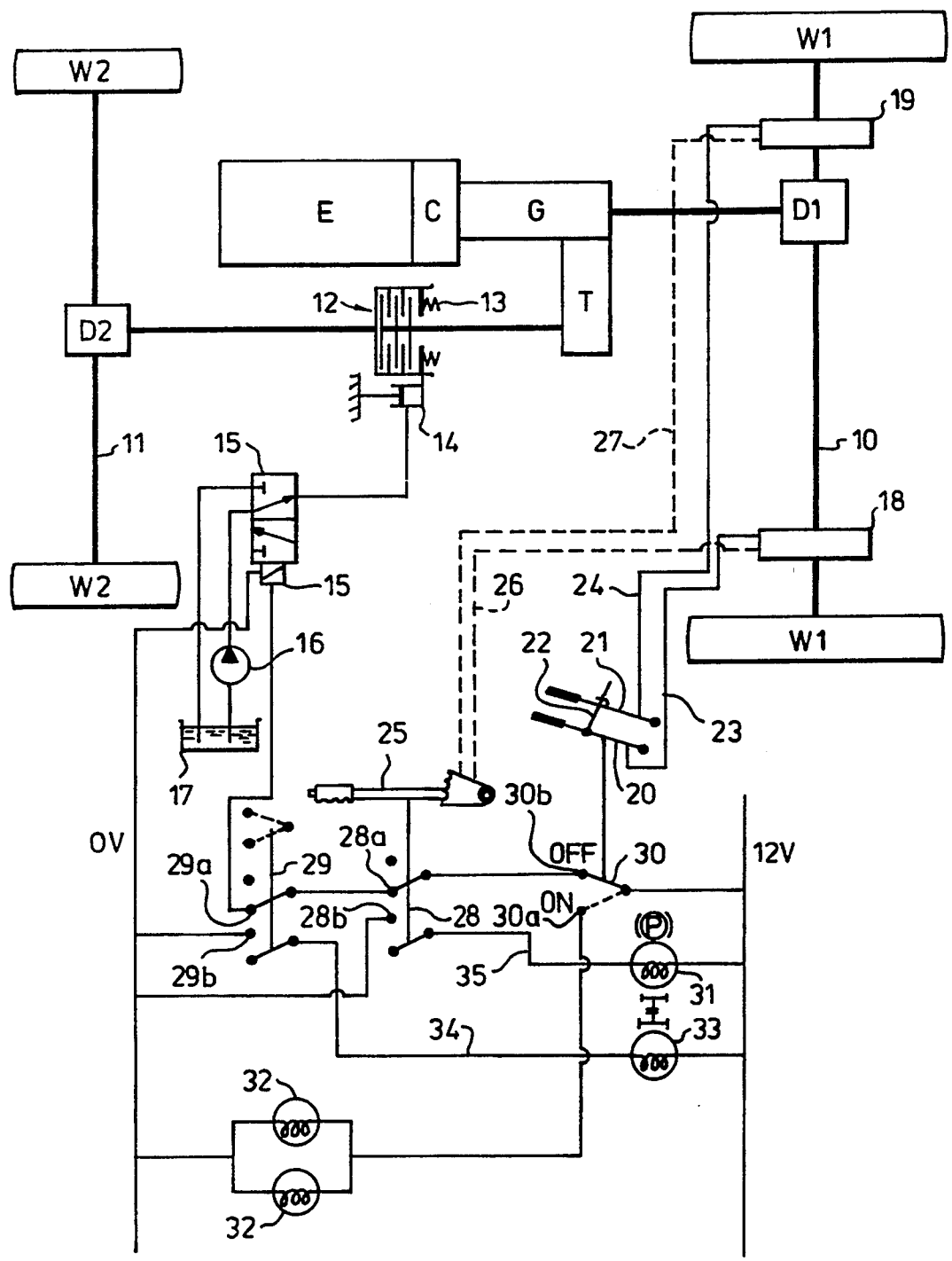

FOUR WHEEL DRIVE VEHICLES

BACKGROUND OF THE INVENTION

This invention relates to four wheel drive vehicles and particularly, though not exclusively, to agricultural tractors.

With the increasing requirement to use agricultural tractors for longer distances on public road, either as towing vehicles or simply to drive between the farm and the fields on the modern, larger farm, it is becoming increasingly more important for such tractors to be able to reach higher road speeds to cut down travelling times and also reduce inconvenience to other road users caught behind slow-moving vehicles.

With tractors now capable of speeds in excess of 30 km/hr the relatively simple braking systems which have hitherto been accepted as adequate are now no longer so and there is an increasing requirement to provide improved braking and deceleration of these vehicles.

It is an object of the present invention to provide a braking facility for a four wheel drive vehicle which is connected to all four wheels and which can be actuated by two independent means.

SUMMARY OF THE INVENTION

Thus according to the present invention there is provided a braking facility for a four wheel drive vehicle having front and rear axles with front and rear pairs of wheels, an engine driving the rear wheels and also connectable to the front wheels via a four wheel drive clutch, and left and right hand brakes on the rear axle operated by a main brake actuating system, the braking facility including a hand brake lever which operates the left and right rear brakes via a system independent from the main brake actuating system, and sensing means associated with the hand brake lever and arranged to engage automatically the four wheel drive clutch when the hand brake is operated to provide a hand brake lever operated braking facility connected to all four wheels which is independent of the main brake operating system and which is operable when the vehicle is in motion.

Conveniently the operation of the four wheel drive clutch can be controlled using fluid pressure via a solenoid-operated fluid-flow control valve. In such an arrangement the sensing means may comprise a switch which is operated on movement of the brake lever to operate the solenoid-operated valve.

Typically the clutch can be arranged to be engaged by spring means and released by the application of fluid pressure to an actuator. In such an arrangement any failure of the fluid pressure, or the switching off of the vehicle ignition, will result in engagement of the clutch and the inter-connection of all four wheels thus providing an added safety factor.

BRIEF DESCRIPTION OF THE DRAWINGS

One embodiment of the invention, as applied to an agricultural tractor, will now be described, by way of example only, with reference to the accompanying drawing which is a schematic diagram of a four wheel drive clutch operating system in accordance with the invention.

DETAILED DESCRIPTION OF THE DRAWINGS

Referring to the drawing, the tractor has an engine E which drives a rear axle 10 with rear wheels W1 via main clutch C, a gearbox G and a rear axle differential D1. The engine E is also connectable to the front axle 11 of the tractor, which is provided with wheels W2 and the differential D2, via a four wheel drive clutch 12.

Clutch 12 is of the multi-plate type and is normally held engaged by spring means shown diagrammatically at 13. The clutch is disengaged (as shown in the drawing) by an hydraulic actuator 14 which when pressurised via a solenoid-operated valve 15 acts against spring means 13 to disengage the four wheel drive clutch. Valve 15 is fed with pressurised fluid by a pump 16 which forms part of the normal hydraulic circuit of the tractor. The pump draws fluid from and returns fluid to a sump 17.

The rear axle 10 is provided with a left-hand brake 18 and a right-hand brake 19 which are operated in a conventional tractor manner by separate left and right-hand brake pedals 20 and 21 respectively. These pedals can be joined together in a conventional manner for simultaneous operation of the brakes by a mechanical latch 22. In the accompanying drawing lines 23 and 24 diagrammatically illustrate the operative connection between the pedals 20 and 21 and the associated respective brakes 18 and 19. It will be appreciated that in an actual system either separate master cylinders or a single tandem master cylinder will be operated by the pedals 20 and 21 and will generate the necessary hydraulic pressure to operate slave cylinders associated with the respective brakes. None of this detail is shown in FIG. 1 since it is all conventional and well understood by those skilled in the art.

The left and right-hand brakes 18 and 19 can also be applied mechanically by a hand brake lever 25, which is mechanically connected to the brakes by cables and rods or other mechanical means indicated diagrammatically by dotted lines 26 and 27 in the accompanying drawing.

In accordance with the present invention, the operation of the hand brake lever (which is shown in the disengaged condition in the accompanying drawing) operates a double pole changeover switch 28 which has its contact 28a closed when the hand brake is not engaged thus energising the solenoid 15a of valve 15 via a series connected double pole rocker switch 29 and a single pole switch 30 operated by the brake pedals 20, 21. Energisation of solenoid 15a directs pressurised fluid to actuator 14 from pump 16, thus ensuring that the four wheel drive clutch is held disengaged.

If the hand brake lever is raised to operate the hand brake function, contact 28a is broken and switch contact 28b is made thus de-energising the solenoid 15a and engaging the four wheel drive clutch. The making of contact 28b also completes a circuit via line 35 to illuminate a hand brake warning lamp 31 on the instrument panel of the tractor.

As will be appreciated by arranging that the four wheel drive clutch 12 is always automatically engaged when the hand brake is applied, the tractor is provided with a braking facility which is connected to all four wheels of the vehicle thus significantly increasing its braking capability which is particularly useful when the vehicle is parked on a slippery slope.

Also, as this braking facility operated by the hand brake is completely independent of the hydraulic operation of the brakes using pedals 20,21, it provides an emergency back-up braking system for the tractor which is connected to all four wheels and which can be engaged when the tractor is on the move should the main braking system, operated by the pedals 20, 21, fail.

The single pole changeover switch 30 associated with pedals 20, 21 closes contact 30a when the brake pedals are pressed to illuminate rear brake lights 32 in a conventional manner. Also, when the brake pedals 20, 21 are pressed simultaneously switch contact 30b is broken thus interrupting the power supply to the solenoid 15a and ensuring engagement of the four wheel drive clutch 12. Thus when either the brake pedals 20, 21 are depressed or the hand brake 25 is engaged the four wheel drive clutch 12 is engaged thereby greatly increasing the effectiveness of the tractor braking functions.

Double-pole, single-throw rocker switch 29 enables the tractor operator to manually select engagement of the four wheel drive clutch 12 by opening switch contact 29a (thus breaking the power supply to the solenoid 15a) and simultaneously closing contact 29b to illuminate a four wheel drive clutch indicator light 33 on the instrument panel via line 34.

The present invention is applicable to a wide range of different types of four wheel drive clutch. For example, the hydraulically-actuated toggle-operated dog type clutch shown in FIG. 7 of published European patent application 0341873 could be operated by valve 15 in place of the multi-plate clutch described.

We claim:

1. A drive system for a vehicle comprising:
   an engine;
   first and second pairs of wheels;
   means for connecting said engine to rotatably drive said first pair of wheels;
   a clutch for selectively connecting said engine to rotatably drive said second pair of wheels with said first pair of wheels;
   a main brake system actuable to selectively brake at least one of said first pair of wheels;
   a secondary brake system actuable to selectively brake at least one of said first pair of wheels independently of said main brake system; and
   an actuator for causing said clutch to connect said second pair of wheels with said first pair of wheels whenever said secondary brake system is actuated.

2. The drive system defined in claim 1 wherein said means for connecting said engine to rotatably drive said first pair of wheels includes a main clutch connected between said engine and said first pair of wheels, said main clutch being actuable to selectively connect said engine, to rotatably drive said first pair of wheels.

3. The drive system defined in claim 2 wherein said means for connecting said engine to rotatably drive said first pair of wheels further includes a transmission connected between said main clutch and said first pair of wheels.

4. The drive system defined in claim 1 wherein said actuator includes a source of pressurized fluid and a valve connected between said source of pressurized fluid and said clutch.

5. The drive system defined in claim 4 wherein said valve is movable between a first position, wherein said source of pressurized fluid communicates with said clutch, and a second position, wherein said source of pressurized fluid does not communicate with said clutch.

6. The drive system defined in claim 4 wherein said clutch is biased toward an engaged position, wherein said second pair of wheels is connected with said first pair of wheels, and is movable upon communication with said source of pressurized fluid toward a disengaged position, wherein said second pair of wheels is disconnected from said first pair of wheels.

7. The drive system defined in claim 6 wherein said valve is actuated by a solenoid for movement between a first position, wherein said source of pressurized fluid communicates with said clutch, and a second position, wherein said source of pressurized fluid does not communicate with said clutch.

8. The drive system defined in claim 7 wherein said main brake system includes a main brake pedal which is selectively movable for braking said at least one of said first pair of wheels, and wherein said valve is moved toward said second position in response to movement of said main brake pedal.

9. The drive system defined in claim 7 wherein said secondary brake system includes a secondary hand brake which is selectively movable for braking said at least one of said first pair of wheels, and wherein said valve is moved toward said second position in response to movement of said secondary hand brake.

10. The drive system defined in claim 1 wherein said actuator further causes said clutch to connect said second pair of wheels with said first pair of wheels whenever said main brake system is actuated.

11. The drive system defined in claim 1 wherein said actuator causes said clutch to disconnect said second pair of wheels from said first pair of wheels only when both said main brake system and said second brake system are not actuated.

12. A drive system for a vehicle comprising:
    an engine;
    a transmission;
    a main clutch for selectively connecting said engine to rotatably drive said transmission;
    a first pair of wheels connected to said transmission so as to be rotatably driven thereby;
    a second pair of wheels;
    a four wheel drive clutch for selectively connecting said transmission to rotatably drive said second pair of wheels with said first pair of wheels;
    a main brake system actuable to selectively brake at least one of said first pair of wheels;
    a secondary brake system actuable to selectively brake at least one of said first pair of wheels independently of said main brake system; and
    an actuator for causing said four wheel drive clutch to connect said second pair of wheels with said first pair of wheels whenever said secondary brake system is actuated.

13. The drive system defined in claim 12 wherein said actuator includes a source of pressurized fluid and a valve connected between said source of pressurized fluid and said four wheel drive clutch.

14. The drive system defined in claim 13 wherein said valve is movable between a first position, wherein said source of pressurized fluid communicates with said four wheel drive clutch, and a second position, wherein said source of pressurized fluid does not communicate with said clutch.

15. The drive system defined in claim 13 wherein said four wheel drive clutch is biased toward an engaged position, wherein said second pair of wheels is connected with said first pair of wheels, and is movable upon communication with said source of pressurized fluid toward a disengaged position, wherein said engine is said second pair of wheels is disconnected from said first pair of wheels.

16. The drive system defined in claim 15 wherein said valve is actuated by a solenoid for movement between a first position, wherein said source of pressurized fluid communicates with said four wheel drive clutch, and a second position, wherein said source of pressurized fluid does not communicate with said four wheel drive clutch.

17. The drive system defined in claim 16 wherein said main brake system includes a main brake pedal which is selectively movable for braking said at least one of said first pair of wheels, and wherein said valve is moved toward said second position in response to movement of said main brake pedal.

18. The drive system defined in claim 16 wherein said secondary brake system includes a secondary hand brake which is selectively movable for braking said at least one of said first pair of wheels, and wherein said valve is moved toward said second position in response to movement of said secondary hand brake.

19. The drive system defined in claim 12 wherein said actuator further causes said four wheel drive clutch to connect said second pair of wheels with said first pair of wheels whenever said main brake system is actuated.

20. The drive system defined in claim 12 wherein said actuator causes said four wheel drive clutch to disconnect said second pair of wheels from said first pair of wheels only when both said main brake system and said second brake system are not actuated.

* * * * *

UNITED STATES PATENT AND TRADEMARK OFFICE
CERTIFICATE OF CORRECTION

PATENT NO. : 5,441,136
DATED : August 15, 1995
INVENTOR(S) : Victor L. Greaves, Christian J. Brace, and Wilhelm Weigt It is certified that error appears in the above-identified patent and that said Letters Patent is hereby corrected as shown below:

Column 3, Claim 2, Line 6,   change "engine," to -- engine --.

Column 4, Claim 14, Line 6,  after "said", insert -- four wheel drive --.

Column 5, Claim 15, Line 6,  after "said", delete -- engine --.

Column 5, Claim 15, Line 7,  before "second", delete -- is said --.

Signed and Sealed this

Twenty-fourth Day of October, 1995

Attest:

BRUCE LEHMAN

Attesting Officer      Commissioner of Patents and Trademarks